No. 646,256. Patented Mar. 27, 1900.
M. B. BENNETT.
CHECK ROW ATTACHMENT FOR CORN PLANTERS.
(Application filed Jan. 16, 1900.)
(No Model.)
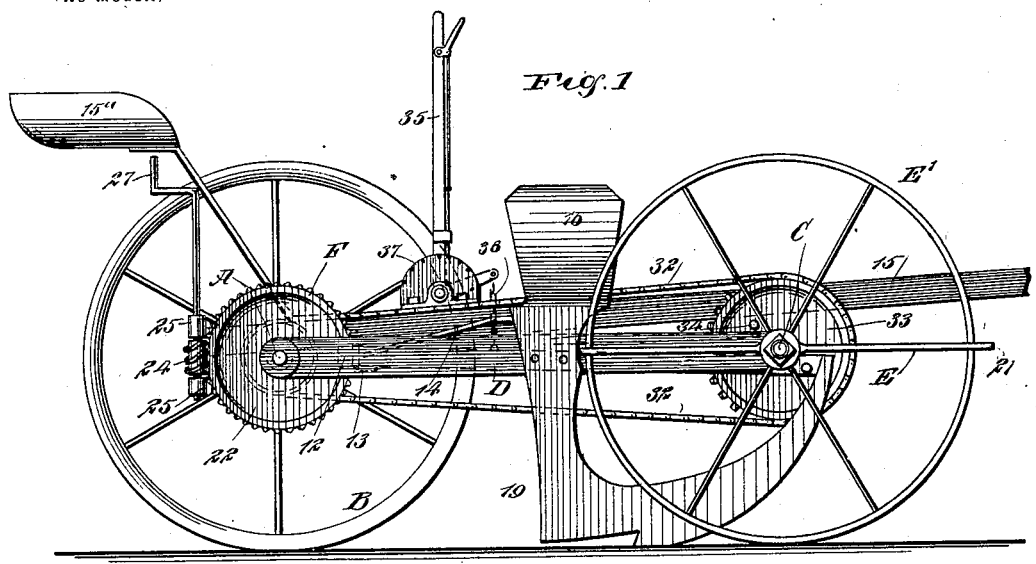
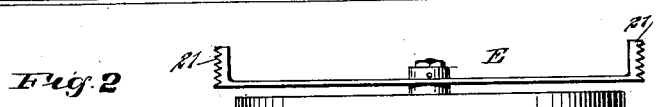
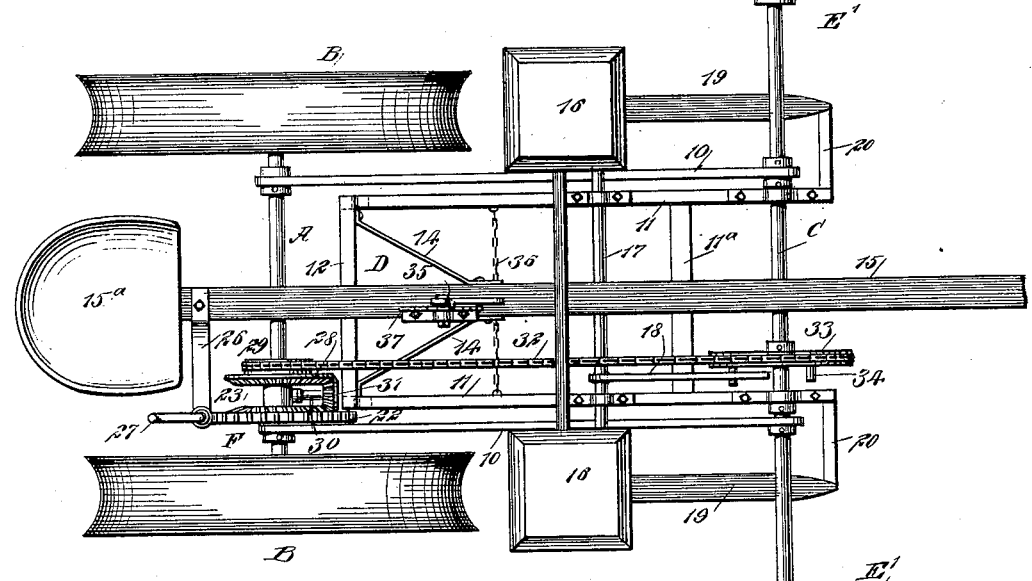
WITNESSES:
INVENTOR,
Martin B. Bennett
BY
ATTORNEYS
THE NORRIS PETERS CO., PHOTO-LITHO., WASHINGTON, D. C.

UNITED STATES PATENT OFFICE.

MARTIN B. BENNETT, OF BOYDEN, IOWA.

CHECK-ROW ATTACHMENT FOR CORN-PLANTERS.

SPECIFICATION forming part of Letters Patent No. 646,256, dated March 27, 1900.

Application filed January 16, 1900. Serial No. 1,637. (No model.)

*To all whom it may concern:*

Be it known that I, MARTIN B. BENNETT, a citizen of the United States, residing at Boyden, in the county of Sioux and State of Iowa, have invented a new and Improved Check-Row Attachment for Corn-Planters, of which the following is a full, clear, and exact description.

One object of my invention is to provide a simple check-row attachment capable of application to any corn-planter and which will be operated from the axle of the planter.

Another object of the invention is to provide two markers at each side of the machine, one of the markers being adapted to indicate where the hills of corn are dropped and the other marker to indicate whether the planter is dropping in line with the rows previously planted.

A further object of the invention is to provide a device under the control of the driver and which may be operated while the machine is in motion, the said device being of such nature that should the planter begin a deviation from the marks of the previous round the driver can instantly correct the deviation and bring the markers to correct position.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the planter having the improvement applied. Fig. 2 is a plan view, and Fig. 3 is a detail sectional view through the mechanism employed for shifting the markers.

A represents the axle of the planter, B the supporting-wheels, and C the forward axle, connected with the rear axle by longitudinal bars 10, in which bars the two axles are journaled. The forward axle C is longer than the rear axle, extending beyond the outer faces of the supporting or ground wheels B, and between the bars 10 a frame D is located, which frame consists of side bars 11, connected by one or more braces 11ª, the rear ends of the side bars of the said frame being connected by hinges 13 with a cross-bar 12, secured to the under face of the pole or tongue 15, on the rear of which the driver's seat 15ª is located.

The forward axle C is journaled in the forward portion of the frame D, and the seedboxes 16, which may be of any type, are shown as secured to the outer bars 10, and a shaft 17 is also shown journaled in the frame D, through the medium of which the seed-dropping mechanism of the boxes may be operated in any approved manner, the said shaft 17 being provided with a forwardly-extending crank-arm 18 to be operated from the forward axle C in a manner to be hereinafter described. The usual runners 19 are provided for the seedboxes 16, and the forward ends of these runners are shown as connected with the frame D by means of cross-bars 20. It may be here remarked that braces 14 are attached to the pole or tongue and to the cross-bar 12 in order to add rigidity to the structure.

A marker E is secured in any suitable or approved manner to each outer end of the axle C, and the said markers consist of a bar-body and feet 21 at the extremities of said body, said feet being at a right angle to the body, extending outwardly therefrom, and usually the outer longitudinal edges of the feet 21 are roughened or serrated. Supporting-wheels E' are loosely mounted on the forward axle C, adjacent to the inner faces of the markers E. One of the markers E is adapted to indicate where the hills of corn are dropped and the other marker is adapted to indicate whether the planter is dropping in line with the rows previously planted.

It frequently happens that the marker on the land side of the planter deviates from the marks of the previous round, and in order to correct this deviation and bring the markers to a correct position while the machine is in motion I provide the shifting mechanism shown in Figs. 2 and 3, through the medium of which mechanism the forward axle C is driven. This shifting mechanism F consists of a gear 22, loosely mounted on the rear axle A, and the said gear is provided with an integral bevel-gear 23 upon its inner face. The plain gear 22 is adapted to mesh with a worm 24, and this worm, as shown in Fig. 1, is journaled in bearings 25, forming a portion of an arm 26, extended from the pole or tongue, and the worm 24 is provided with a suitable shaft extending upwardly adjacent to the driver's seat and terminating in a crank 27. It will be observed that as long as the worm is stationary the double gear 22 and 23 will also remain stationary. A bevel-gear 28 is also loosely mounted on the rear axle A, and this bevel-gear 28 is provided with an attached sprocket-wheel 29. An arm 30 is secured to the rear axle A, which arm extends between the bevel-gears 23 and 28 and carries at its outer end a loosely-mounted bevel-pinion 31, which pinion meshes with the teeth of the bevel-gears 23 and 28. Thus it will be observed that when the worm 24 is stationary and the machine is in motion the pinion 31, traveling in engagement with the teeth of the stationary gear 23, will cause the opposing gear 28 to revolve, and consequently the sprocket-wheel 29, and as this sprocket-wheel 29 is connected by a belt 32 with a sprocket-wheel 33 on the forward axle C this axle will be also turned.

The forward sprocket-wheel 33 is twice the diameter of the sprocket-wheel 29, and the gear 28 makes two revolutions for each revolution of the arm 30. It will likewise be observed that whenever it is necessary to turn the axle C to correct the position of the markers E this can be readily accomplished by turning the crank 27 in proper direction, thus rotating the gears 22 and 23 and communicating movement to the gear 28 and sprocket 29. The larger sprocket-wheel 33 on the axle C is provided with two pins 34, which as the sprocket-wheel revolves act to trip the arm 18, connected with the seed-dropping mechanism, and operate the same.

It will be observed that the markers under the arrangement described are compelled to keep proper time with the balance of the machine and that the dropping mechanism of the planter will be in perfect time with the markers; also, that through the medium of the crank 27 and shifting-gear F the driver may set the dropping and marking mechanism when starting at the end of the cornfield and also rectify any deviation from the line of previous hills and marks while crossing the field by simply turning the crank 27 one way or the other and without stopping the team or leaving the seat.

The frame D and the side bars 10 and the parts carried thereby may be raised whenever desired through the medium of a lever 35, fulcrumed upon the pole or tongue 15 and connected with the frame D by chains 36 or their equivalent, and a suitable rack 37 is provided for the thumb-latch of the said lever.

Having thus described my invention, I claim as new and desire to secure by Letters Patent—

1. In a check-row attachment for planters, a marker shaft or axle, a supporting-axle, bevel-gears loosely mounted on the supporting-axle, means for holding one of the said gears stationary, a belt connection between the other gear and the marker axle or shaft, and a pinion carried by the main axle and meshing with the said gears, as set forth.

2. In a check-row attachment for planters, a frame provided with a main axle and a supporting-wheel, a forward axle journaled in the frame, longer than the rear axle, supporting-wheels loosely mounted on the forward axle, and markers secured to the outer ends of the said forward axle, bevel-gears loosely mounted on the main axle, means for holding one of said gears stationary or for turning the said gear, a sprocket-wheel secured to the other gear, a belt connection between the said sprocket-wheel and the larger wheel on the forward axle, an arm extended from the main axle between the said gears, and a bevel-pinion loosely mounted on the said arm, engaging with the two gears on the main axle, as set forth.

3. In a check-row attachment for planters, the combination, with a wheel-supported frame and seed-dropping mechanism, of a forward axle provided with supporting-wheels, the forward axle being longer than the main axle of the frame, supporting-wheels loosely mounted on the forward axle and markers secured to the outer ends of the forward axle, a plain gear having a bevel-gear upon its inner face loosely mounted on the main axle, a bevel-gear also loosely mounted on the main axle and provided with a sprocket-wheel, a larger sprocket-wheel secured on the forward axle, which larger sprocket-wheel is provided with trip-pins for engagement with the seed-dropping mechanism, a belt connection between the two sprocket-wheels, an arm secured to the main axle, and located between the gears, a bevel-pinion loosely mounted on the said arm, engaging with the bevel-gears on the rear axle, a worm-wheel in engagement with the main axle, and means for operating the worm-wheel.

In testimony whereof I have signed my name to this specification in the presence of two subscribing witnesses.

MARTIN B. BENNETT.

Witnesses:
D. J. LOWRY,
L. L. LOWRY.